United States Patent [19]

Ohmura et al.

[11] 4,414,730

[45] Nov. 15, 1983

[54] METHOD FOR PROCESSING PAPER SHEETS OF BANDED PAPER SHEET BUNDLES AND A PROCESSING MACHINE THEREFOR

[75] Inventors: Hideo Ohmura; Shigeo Horino, both of Tokyo, Japan

[73] Assignee: Tokyo Shibaura Denki Kabushiki Kaisha, Kawasaki, Japan

[21] Appl. No.: 303,491

[22] Filed: Sep. 18, 1981

[30] Foreign Application Priority Data

Sep. 22, 1980 [JP] Japan ............ 55-132141
Oct. 2, 1980 [JP] Japan ............ 55-137910
Oct. 13, 1980 [JP] Japan ............ 55-142735

[51] Int. Cl.³ ............ B23P 19/00

[52] U.S. Cl. ............ 29/426.3; 29/426.4; 29/564.3; 53/381 R; 83/909; 83/924; 414/114; 209/534

[58] Field of Search ............ 29/426.1, 426.3, 564.3, 29/426.4; 53/492, 351 R, 587; 493/343; 83/924, 909, 89; 414/114; 209/534, 900

[56] References Cited

U.S. PATENT DOCUMENTS 3,513,522 5/1970 Thomson ............ 83/909
4,167,476 9/1979 Jackson ............ 209/900
4,347,936 9/1982 Fasig ............ 209/900

*Primary Examiner*—Francis S. Husar
*Assistant Examiner*—David B. Jones
*Attorney, Agent, or Firm*—Cushman, Darby & Cushman

[57] ABSTRACT

A method for processing paper sheets of banded paper sheet bundles and a processing machine therefor, in which a plate-like to-be-detected medium made of magnetic material is inserted between each paper sheet bundle and a band put thereon, and the bundles are set in layers in the processing machine and delivered successively from top to bottom into a setting section where a delivery roller is disposed. The band of the bundle located in the setting section is cut, and transferred together with the to-be-detected medium to a storing section as the to-be-detected medium is attached to an electromagnet. The paper sheets are successively carried out by the delivery roller, and the to-be-detected medium attached to the next bundle is detected by a detecting means after all the paper sheets of the bundle concerned are carried out. Thus, the operation of the delivery roller is once disabled to allow the delivered paper sheets to be checked.

25 Claims, 12 Drawing Figures

METHOD FOR PROCESSING PAPER SHEETS OF BANDED PAPER SHEET BUNDLES AND A PROCESSING MACHINE THEREFOR

BACKGROUND OF THE INVENTION

This invention relates to a method for processing paper sheets of banded paper sheet bundles in which the paper sheet bundles each consisting of a plurality of paper sheets tied up with a band are set in a setting section where a delivery roller is disposed, and the paper sheets are successively extracted from the set bundles by means of the delivery roller and delivered to a discriminating section for discriminating e.g. abnormal paper sheets from normal ones.

Let it be supposed that the paper sheets are bank notes. Bank notes from local banks or branches, are throughly examined in a central bank. For example, the genuineness of the bank notes is examined, that is, abnormal notes are discriminated from normal ones.

Normally, delivered bank notes are tied up in bundles with paper bands, each bundle consisting of a fixed number of notes, e.g. 100 notes. Conventionally, these bundles of bank notes are processed in the following manner.

First, the band on each bundle is stamped with several pieces of necessary information including the date of processing, name of consignor bank, name of person in charge, etc. Then, a fixed number of bundles, e.g. 10 bundles, as a unit are put in the processing machine. The band of each bundle is removed before the bundle is put in the machine. Instead of the band, a sheet-like card is put on each bundle, and the bundles are set in layers in the processing machine. Each card is, for example, numbered so that the removed band to which the bundle belongs may be verified at once. Namely, by observing the reference number on the card, the band corresponding to the card number can be found, and specified information on the band can be obtained.

The uppermost group of the bundles of bank notes with the cards sandwiched between them is located in the setting section, and the bank notes, along with the cards, are carried out successively by the delivery roller. Judgment is made as to whether the bank notes are of the normal type. Then collected in a reject pocket are those of the bank notes which have been found abnormal and the cards attached to the respective bundles of bank notes in which one or more bank notes have been judged to the abnormal.

It is evident that an abnormal paper sheet belongs to the last card which is brought into the reject pocket, so that the band on the bundle including the abnormal paper sheet can be detected from the reference number on the card, and the information on the band can be obtained. Thus, the original bundle to which the abnormal paper sheet has belonged can be detected.

The aforementioned processing method, however, is subject to various drawbacks. First, the bands on the bundles need be removed before the bundles are set in the processing machine. Secondly, it is necessary to place a card on each bundle and to record in the card the correlation between the card and the removed band. These operations as preliminary arrangements will bother an operator much. Moreover, it is quite troublesome to set the unbanded bank notes and cards in the processing machine without collapse.

Since the cards are carried out in the same manner as the bank notes, they need be of the same material and thickness as the bank notes for the ease of delivery. Besides these restrictions on the material and thickness, the cards need be frequently replaced due to their poor durability, resulting in an increase in running cost as it is called.

Further, the removed bands, at least the bands for a unit of bundles, e.g 10 bundles, being processed in the processing machine must be kept in custody for reference until the processing operation is completed.

Disclosed in U.S. Pat. No. 4,236,639 is an arrangement in which banded bundles are set in the processing machine and bands are removed from the bundles before paper sheets are carried out. In this specification, however, there is not stated any means for verifying the original bundle to which a paper sheet carried out by a delivery roller belongs.

SUMMARY OF THE INVENTION

Accordingly, the object of this invention is to provide a method for processing paper sheets of banded paper sheet bundles and a processing machine therefor, facilitating preliminary setting of the paper sheet bundles, requiring no use of serially numbered cards for reference, reduced in running cost for processing, and capable of more accurate processing.

To this end, according to this invention, the banded paper sheet bundles are set in layers in a setting section of the processing machine without removing bands on the bundles. The band on the bundle is removed directly before the uppermost paper sheet of the bundle is taken out of the setting section. A to-be-detected medium bearing detection information common to all the bundles is attached to each bundle. For this medium, there is proposed a plate-like medium which is inserted between its corresponding bundle and a band thereon. Although such insertion is manually performed before the bundle is put in the processing machine, it requires no special care due to the commonness of the medium. A detecting means for detecting the to-be-detected medium is disposed over the setting section, and detects the medium attached to the bundle which has reached the setting section.

After the band is removed from the bundle located in the setting section, the paper sheets of the bundle are successively carried out. After all the paper sheets of the bundle are carried out, the next bundle is pushed to be located in the setting section. The location of the next bundle is confirmed by the detection of the to-be-detected medium attached to the next bundle by means of the detecting means. By such detection, the delivery of the paper sheets is once stopped. While the delivery is stopped, the delivered paper sheets can be checked for its normality and number. On completion of such checking, the delivering operation is manually restarted. The band of the next bundle is removed directly before the restart. Thus, according to this invention, the delivery of the paper sheets is once stopped every time the to-be-detected medium attached to each bundle is detected by the detecting means, and the paper sheets are examined meantime. Accordingly, the bundle to which the processed paper sheet belongs can be identified at once. Since the bundles are set in the processing machine as they bear the bands, there is no fear of the stacked paper sheets collapsing.

The plate-like to-be-detected medium is preferably be made of magnetic material high in electric conductivity. After the band is cut, an electromagnet disposed at the setting section attracts the medium. At the same time, the cut band is carried to a storing section as it is sandwiched between the electromagnet and the medium. Thus, the cut band is sure to be removed from the bundle, and the medium itself will never be carried out. Accordingly, there are no special restrictions on the size, shape or thickness of the to-be-detected media. Enjoying commonness to all the bundles as aforesaid, moreover, these media can be used repeatedly if they are made out of tough material, leading to a substantial reduction in running cost.

The to-be-detected medium can also be provided on the band of each bundle. In this case, the medium is formed by applying fluorescent material or special ink to a partial region of the band surface so as to be detected by an optical detecting means. Instead of being applied directly to the band, the fluorescent material or special ink may be applied to a label which is to be bonded to the band. Also, the medium may be formed of a material that can be detected by an electromagnetic or electric detecting means.

The reliability of the delivery of the paper sheets by means of the delivery roller can be improved by removing the cut band from its corresponding bundle before the start of such delivery. Since the force of the band to hold the paper sheets, however, is reduced by a large margin once the band is cut, the delivery of the paper sheet can be performed at the same time with the removal of the cut band. Thus, the processing can be speeded up.

Figure 1:
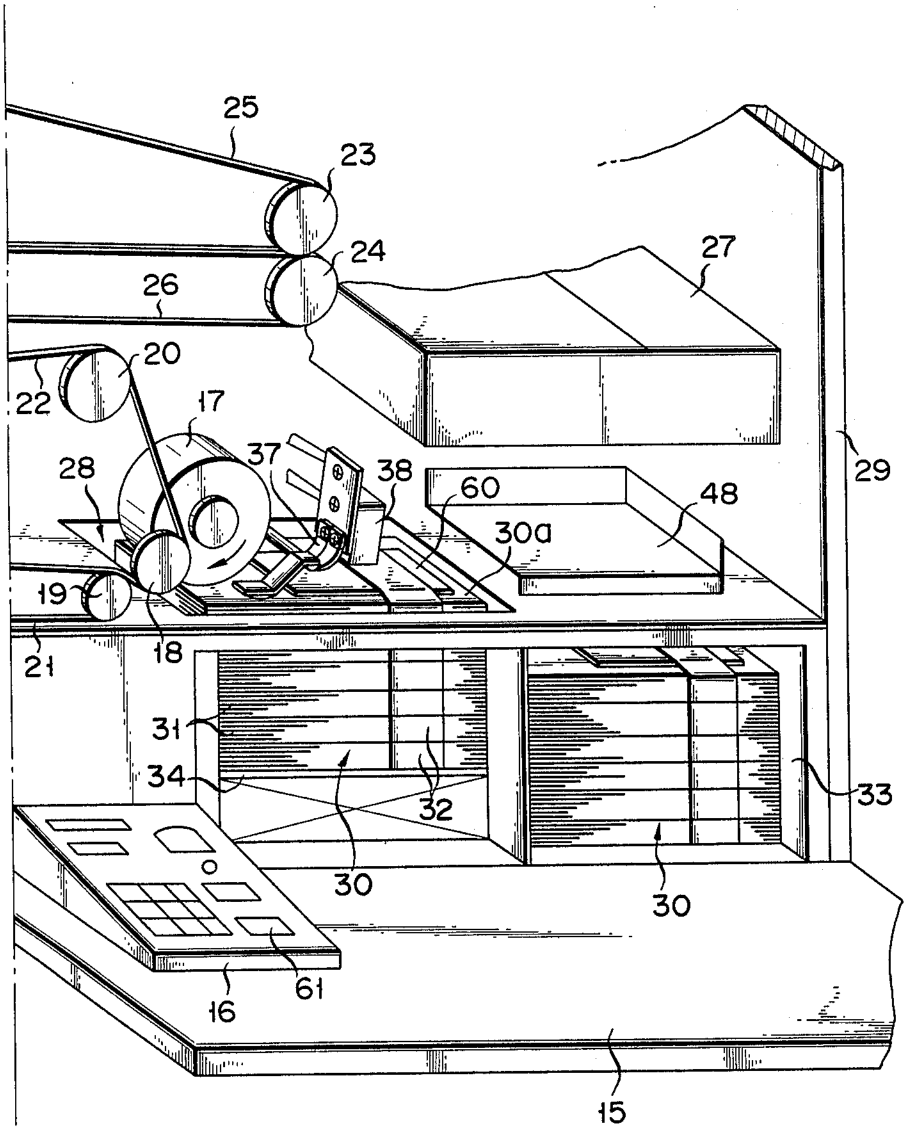
FIG. 1 is a general perspective view of a first embodiment of the processing machine of this invention.

Now there will be described in detail the preferred embodiments of this invention with reference to the accompanying drawings.

DETAILED DESCRIPTION OF THE PREFERRED EMBODIMENTS

In a processing machine according to a first embodiment of this invention shown in FIGS. 1 to 4, a table 15 carries a keyboard 16 on which an operator manually inputs necessary information. A delivery roller 17 constituting a delivery means can rotate in the direction of an arrow of FIG. 1. Following the roller 17, rollers 18, 19 and 20 and belts 21 and 22 for carrying out paper sheets are connected with a paper sheet discriminating mechanism section (not shown). In this discriminating mechanism section, the genuineness or entirety of the paper sheets—bank notes in this embodiment—are examined, and abnormal sheets are collected in an abnormal sheet collecting box 27 by means of rollers 23 and 24 and belts 25 and 26. Since the mechanism of these sections is generally known, detailed description of such mechanism is omitted herein.

In the vicinity of the delivery roller 17, a setting section 28 is formed open in a processing machine frame 29. A plurality of paper sheet bundles 30, e.g. 10 bundles as a unit, each consisting of a multitude of paper sheets 31, e.g. 100 sheets as a unit, tied up with a band 32 are regularly set in layers in the section 28. Beside the section 28, a multitude of additional banded paper sheet bundles 30 to be processed are stored in a stand-by storing chamber 33.

The bundles 30 piled up in the setting section 28 are gradually forced up by a support plate 34 during a processing operation. Strictly speaking, the setting section 28 is defined as the position of the uppermost bundle **30*a* which is in contact with the delivery roller 17**.

Disposed over the setting section 28 are a pair of pressing levers 35, a rotary solenoid 36 for driving the levers 35 to rock, an electric contact brush 37 forming a detecting means, and an electromagnet 38 forming a band removing means. The brush 37 and the electromagnet 38 are integrally fixed to the free end portions of a pair of movable arms 39 and 40 by means of a fitting block 41. The base end portions of the movable arms 39 and 40 are guided and supported respectively by guide shafts 42 and 43 extending horizontally in parallel with each other. A rotary solenoid 44 is coupled to one end of the shaft 43 which is square in section so that the pair of arms 39 and 40 may rock within a vertical plane. The base end of the movable arm 39 supported by the other shaft 42 which is circular in section is fixed by means of a fitting block 47 to a driving belt 46 which is driven horizontally by a motor 45. Thus, the pair of movable arms 39 and 40 are caused to move horizontally. Namely, the section including the electromagnet 38 and the brush 37 can move both vertically and horizontally.

A band storing section 48 is disposed adjacently to the setting section 28. The storing section 48, which is in the form of an open box, is located in one terminal position of the horizontal path of the electromagnet 38.

The electromagnet 38 and the brush 37 are connected with a power source (not shown) inside the processing machine body by means of a cord 49.

Figure 2:
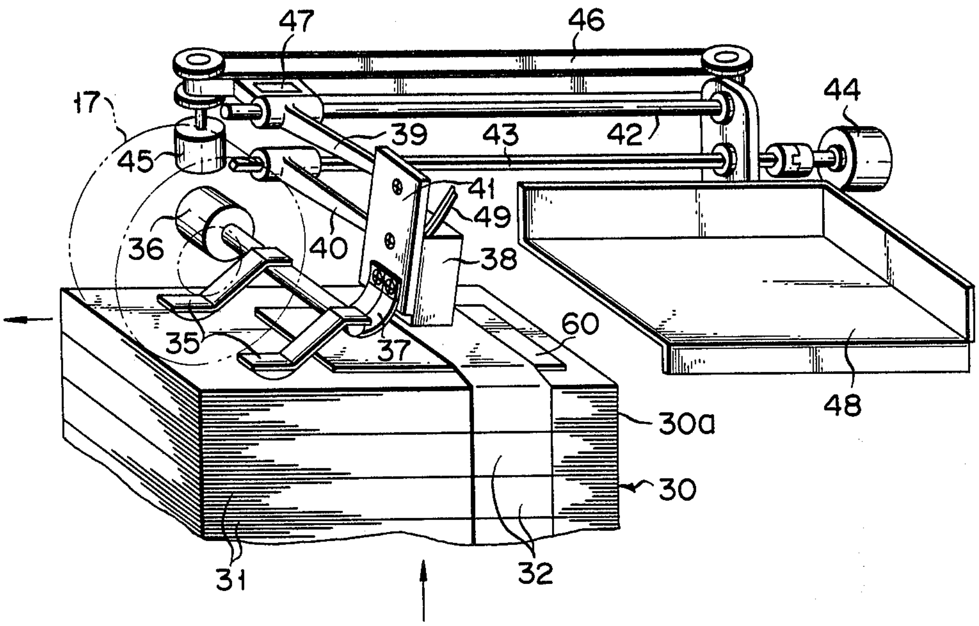
FIG. 2 is an enlarged perspective view of the principal mechanism of the processing machine of FIG. 1.
Figure 3:
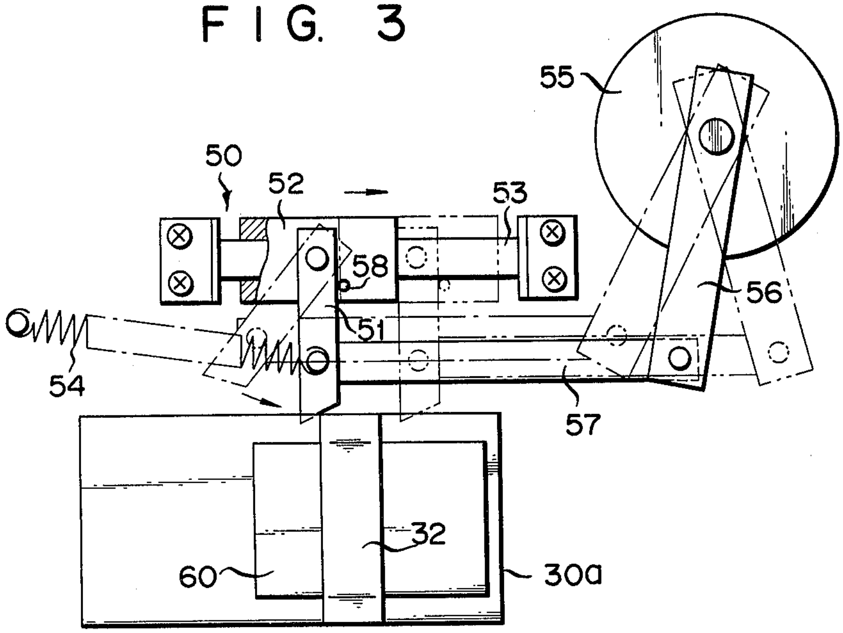
FIG. 3 is an enlarged plan view showing a band cutting mechanism (omitted in FIG. 1) of the processing machine of FIG. 1 and operation modes thereof.

At the setting section 28, a band cutting mechanism 50 as shown in FIG. 3 is disposed on one side of the stacked bundles 30, that is, on the rear side of the bundles 30 in FIGS. 1 and 2. In FIG. 3, a knife member 51 of the mechanism 50 is pivotally mounted on a slider 52 which is slidably supported on a horizontal shaft 53. Both ends of the shaft 53 are fixed to the processing machine body. A return spring 54 is anchored to the free end portion of the knife member 51 on which one end of a connecting lever 57, which is linked with a rotary solenoid 55 by means of a lever 56, is pivotally mounted. Normally, the knife member 51 is held by the spring 54 in a position represented by an alternate long and short dash line. The rotary solenoid 55 starts operation when a band 32 on the bundle 30*a* at the setting section 28 is to be cut. The knife member 51 is pulled by the lever 57 to rock first against the spring 54 to a position represented by a solid line, abutting against a pin 58 on the slider 52. When the knife member 51 is further pulled, the slider 52 slides in the direction of an arrow to cause the knife member 51 to make a parallel movement in a body with the slider 52 to a position represented by an alternate long and two short dashes line. Meanwhile, the band 32 is cut by the edge of the knife member 51 at the flank portion of the bundle 30*a*. After the cutting operation, the knife member 51 is returned to the position of the alternate long and short dash line by the spring 54.

The arrangement of the band cutting mechanism shown in FIG. 3 is given by way of example only, and the band may be cut by a simpler arrangement, e.g. by simply rocking the knife member. The arrangement of FIG. 3, however, is preferable because it prohibits the edge of the knife member from getting deep into the flank of the bundle.

In this embodiment, rectangular plates 60 made of magnetic material high in electric conductivity are used as media to be detected. The plates 60 have a common shape for each bundle and are exchangeable. In other words, the plates 60 have a single common detection information for the detecting means 37.

As illustrated, each plate 60 is inserted and sandwiched between the top face of its corresponding bundle 30 and the band 32. The insertion of the plate 60 is performed before the bundle 30 is put in the setting section 28.

Figure 4:
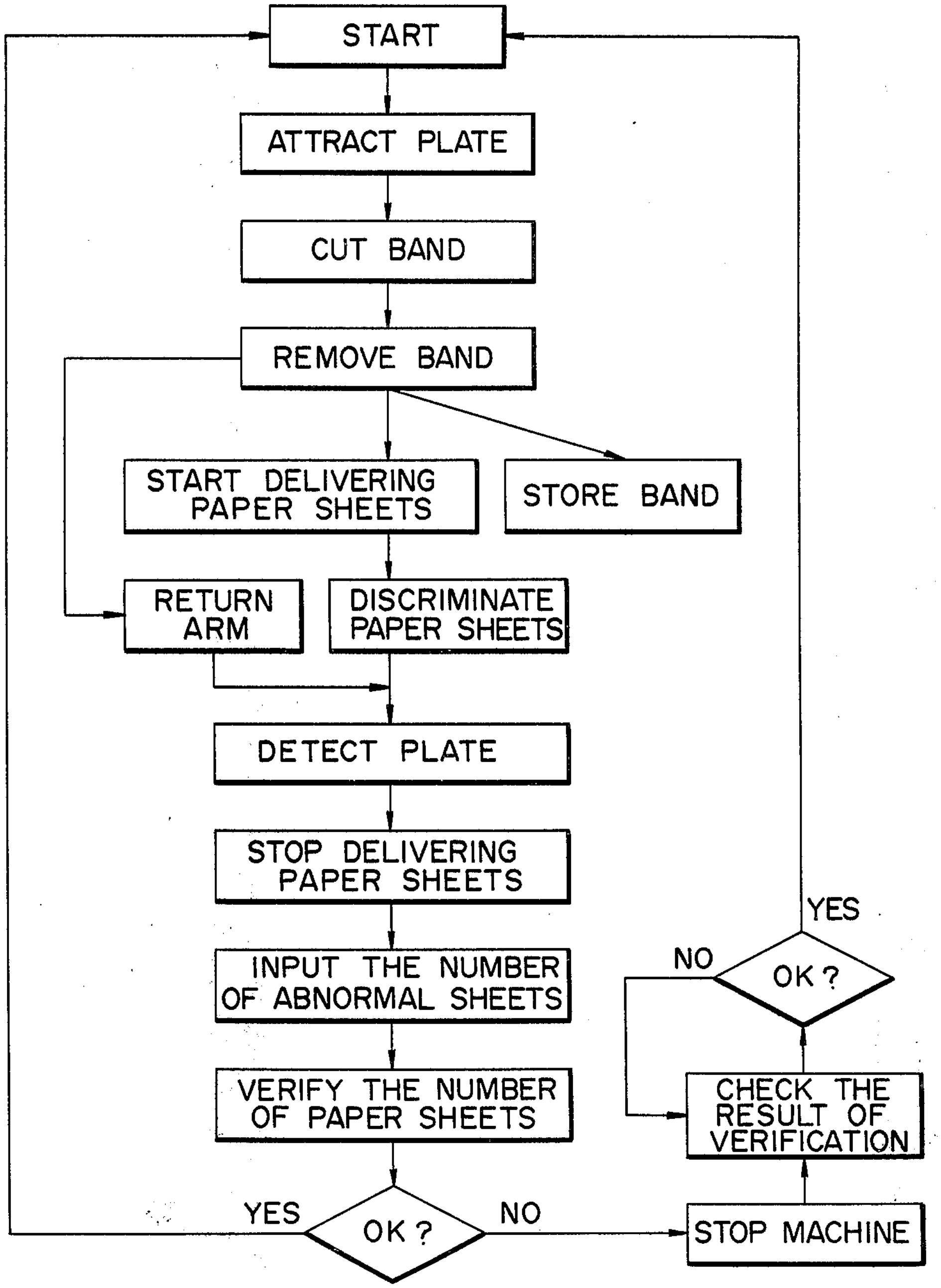
FIG. 4 is a performance flow chart of the processing machine of FIG. 1.

Referring now to FIG. 4, there will be described the processing operation of the processing machine according to the first embodiment.

When a start button 61 on the keyboard 16 is pressed down, the support plate 34 rises to force up the uppermost bundle 30*a* out of the stacked bundles 30 to the position of the setting section 28, where the bundle 30*a* comes in contact with the delivery roller 17 and the delivery levers 35. Then, the brush 37 as the detecting means comes in contact with the plate 60 to achieve electric connection between the brush 37 and the plate 60, thereby confirming that the uppermost bundle 30*a* has reached the setting section 28. Thus, the electromagnet 38 is excited to attract the plate 60. As a result of such attraction, the band 32 is held between the electromagnet 38 and the plate 60. Thereafter, the band cutting mechanism 50 operates to cut the ring-shaped band 32.

Subsequently, when the arms 39 and 40 rock upward, the electromagnet 38 attractingly holds up the cut band 32 and the plate 60 together, so that the band is removed from the bundle 30*a*. When the arms 39 and 41 move horizontally and reach the storing section 48 to demagnetize the electromagnet 38 thereat, the cut band and plate drop into the section 48 to be stored therein. When the removal of the band and plate is finished, the arms 39 and 41 return to their original positions to stand by.

The pressing levers 35 having been pressed against the unbanded bundle 30*a* rises to leave the surface of the uppermost paper sheet of the bundle 30*a*, and the rotating delivery roller 17 carries the paper sheets 31 one by one in the direction of the arrow of FIG. 2 from top to bottom. Although not illustrated in detail, a multitude of attraction holes are bored in the peripheral surface of the delivery roller 17 so that the paper sheet may be attracted to the roller 17 through the holes by the agency of vacuum effect.

The delivered paper sheets are counted and discriminated in its normality at the discriminating mechanism section (not shown). Abnormal sheets are collected in the collecting box 27.

Thus, while the paper sheets of the unbanded bundle concerned are being carried out, the support plate 34 gradually rises to force up the next bundle 30 toward the setting section 28. When all the paper sheets are carried out, the plate 60 as the to-be-detected medium of the next bundle 30 is brought in contact with the detecting means or brush 37. As a result, it is confirmed that all the paper sheets of the first bundle have been carried out, and that the next bundle has reached the setting section 28. Then the detecting means electrically gives an instruction to the rotary solenoid 36 for the pressing levers 35, thus driving the levers 35. The solenoid 36 rocks the levers 35 counterclockwise as shown in FIG. 2. As a result, the uppermost paper sheet 31 of the bundle 30 comes out of the engagement with the delivery roller 17. Then, the paper sheets are no longer delivered, though the roller 17 keeps on rotating. In other words, the paper-delivering is disabled. The paper-delivering is restarted when the operator pushes the start button 61 which is provided on the keyboard 16.

Alternatively, the pressing elements 35 may be omitted. In this case the delivery roller 17 is stopped. Or the delivery roller may be moved away from the paper sheet so that the delivery of paper is stopped.

Hereupon, the number of the abnormal sheets collected among the delivered paper sheets and the necessary information on the band 32 of the first bundle left in the band storing section 48 are keyed in by means of the keyboard 16 to perform verification as it is called. If the verification is performed normally, the start button 61 is again manually pressed down to proceed to a processing operation for the next bundle. If the verification cannot be achieved yet, however, the processing machine is stopped, and the processing of the next bundle is entered after a checking process.

According to the flow chart of FIG. 4, in this embodiment, the delivery of the paper sheets by means of the delivery roller is started after the cut band is removed from the bundle. Alternatively, however, the removal of the band and the delivery of the paper sheets may be performed simultaneously. This is possible because the band will greatly be reduced in its force to hold the bundle when it is cut. Thus, the processing operation can be speeded up.

In any case, bundles including abnormal paper sheets can be detected at once by processing the paper sheets in this manner. Since the bundles can be set in the processing machine without removing the bands thereon, there is no fear of the stacked paper sheets collapsing. The plates on the to-be-detected media are common for each bundle and can stand prolonged, repeated use due to the absence of the restrictions on the shape and thickness, thus ensuring reduced running cost.

In this embodiment, the to-be-detected medium is formed of a plate the whole contact-side surface of which is conductive. Alternatively, for example, fluorescent material or special ink may be applied to the whole surface of the plate so that it may be detected by an optical detecting means.

Further, the plate may be finished to have a mirror surface and an optical detecting means may be sued which detects light reflected from the mirror surface of the plate.

Figure 5:
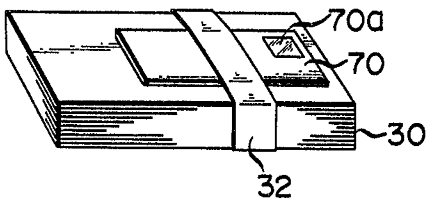
FIG. 5 is a perspective view of a paper sheet bundle accompanied with a to-be-detected medium in a style different from the one shown in FIG. 1.
Figure 6:
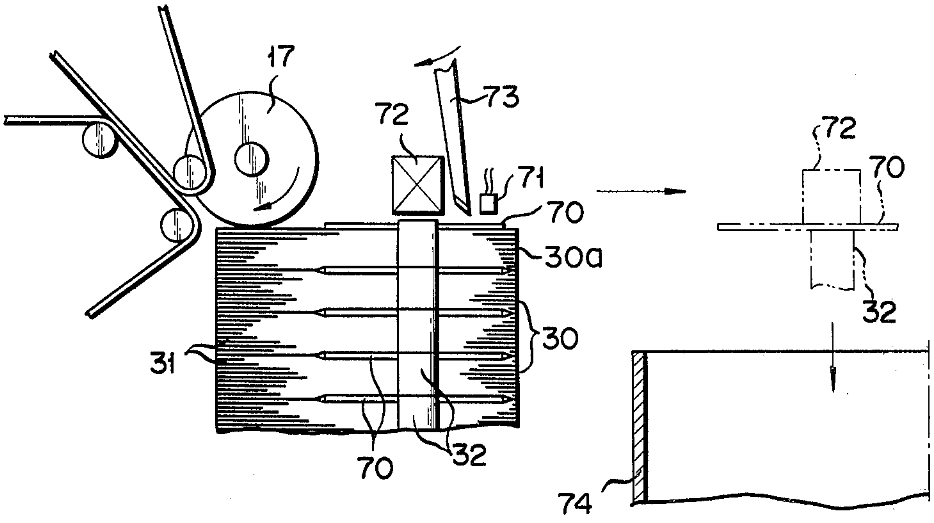
FIG. 6 is a partial elevation of a second embodiment of the processing machine using the bundle shown in FIG. 5.
Figure 7:
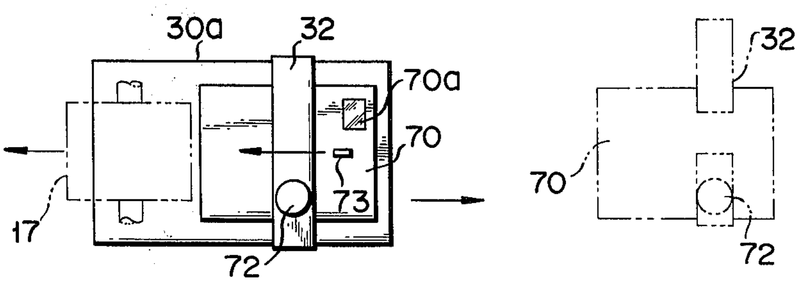
FIG. 7 is a schematic top view of the processing machine of FIG. 6.

Now there will be described a second embodiment of the invention as shown in FIGS. 5 to 7, laying stress on points of difference as compared with the first embodiment. In FIGS. 5 to 7, as well as in FIGS. 8 to 12, like reference numerals are used to designate like portions through the several views, and detailed description of such portions is omitted herein.

In the second embodiment, as in the first embodiment, a plate 70 made of magnetic material high in electric conductivity is used as the medium to be detected. In this case, however, an optical detecting means 71 is used for detecting the medium. Formed on one side of the plate 70 is a detection region 70*a* to which fluorescent material or special ink is applied. The region 70 is to face the detecting means 71 when its corresponding bundle 30 is located in the setting section. As shown in FIG. 7, an electromagnet 72 attracts the plate 70 at somewhat biased portion of the paper sheet while holding a band 32 between itself and the plate 70. In this case, a knife member 73 for cutting the band 32 cuts the band 32 on the plate 70 along the longitudinal center line of the paper sheet as indicated by an arrow of FIG. 7. In any case, the electromagnet 72 is prevented from interfering with the knife member 73. Since the band 32 is cut on the plate 70, there is no possibility of the paper sheets 31 being damaged by the knife member 73 while cutting.

The cut band 32, along with the plate 70, is carried in the direction of an arrow to a position over a storing section 74 formed of an open-top storing box, as represented by alternate long and two short dashes lines in FIGS. 6 and 7, and is dropped into the section 74 as indicated by an arrow when the electromagnet 72 is demagnetized.

Figure 8:
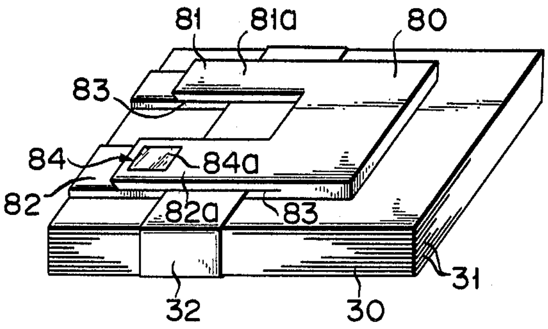
FIG. 8 is a perspective view of a paper sheet bundle accompanied with a to-be-detected medium in a style different from the one shown in FIG. 5.

A plate 80 of a modified construction as the to-be-detected medium, as shown in FIG. 8, is substantially U-shaped. Each of legs 81 and 82 of the plate 80 has a slit 83 to hold a band 32 therein. Upper leg portions 81*a* and 82*a* of the legs 81 and 82 split by the slits 83 are shorter than lower leg portions. Thus, the plate 80 can easily be engaged with the band 32.

A region 84*a* for optical detection similar to the one used in the second embodiment is defined on one leg 82 of the plate 80 to form a to-be-detected medium 84.

It is necessary only that the plate 80 be inserted between a bundle 30 and the band 32 put thereon.

Figure 9:
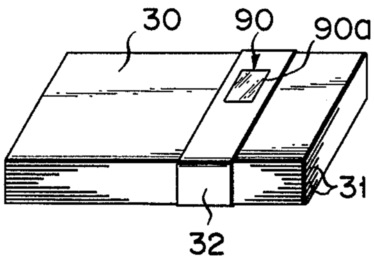
FIG. 9 is a perspective view of a paper sheet bundle accompanied with a to-be-detected medium in a further different style.
Figure 10:
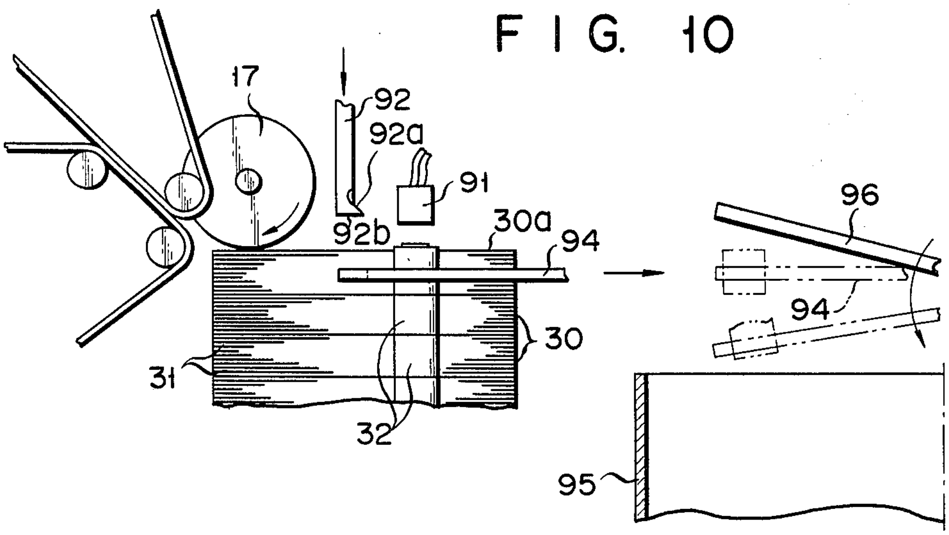
FIG. 10 is a partial elevation of a third embodiment of the processing machine using the bundle of FIG. 9.
Figure 11:
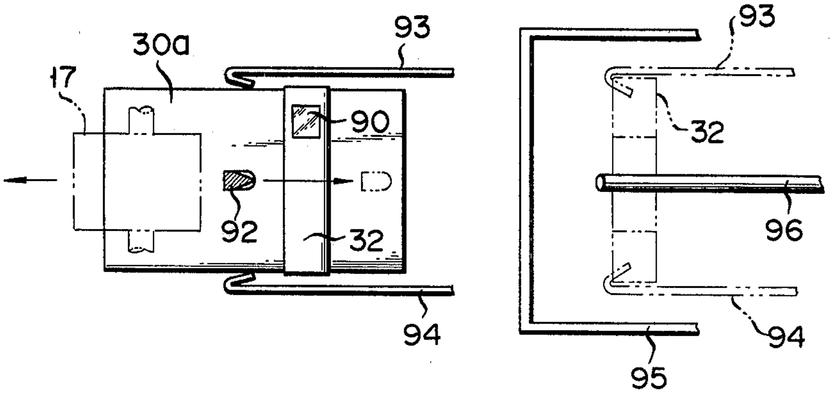
FIG. 11 is a schematic top view of the processing machine of FIG. 10.

In a third embodiment shown in FIGS. 9 to 11, a to-be-detected medium 90 is disposed on a band 32 put on a bundle 30, and no special plate is used.

The to-be-detected medium 90 is formed by applying fluorescent material or special ink to a small rectangular region at a portion near one end of the band portion located on the top of the bundle 30.

As shown in FIG. 10, an optical detecting means 91 faces the medium 90 on the band 32 of the uppermost bundle 30*a* out of the stacked bundles 30, the uppermost bundle 30*a* being located in the setting section.

In this embodiment, just as in the second embodiment, the band 32 is cut in the direction of an arrow of FIG. 11 at the central portion of the top surface of the bundle. As shown in FIG. 10, an edge 92*a* of a knife member 92 is in a peculiar shape, having a flat bottom end face 92*b*. In cutting operation, the knife member 92 is first lowered in the direction of an arrow of FIG. 10 to have its bottom end face pressed against the uppermost paper sheet 31. As a result, the top surface of the bundle becomes hollow to form a space between itself and the band 32. In this stage, the knife member 92 advances in the direction of an arrow of FIG. 11 to cut the band 32. Thus, the band can be cut without damaging the paper sheet.

In this embodiment, a pair of hook members 93 and 94 are used for the removal of the band 32. Facing the side faces of the bundle 30*a* in the setting section, the hook members 93 and 94 engage the band 32 to carry the cut band 32 to a position over a storing section 95 as indicated by alternate long and two short dashes lines in FIGS. 10 and 11. A rod-like beat member 96 disposed over the section 95 beats the band delivered thereto as indicated by an arrow of FIG. 10 so as to separate the band by compulsion from the hook members 93 and 94 and to drop the band into the storing section 95.

According to this invention, as described in connection with the third embodiment, it is not always necessary to use a plate or some other special member as the to-be-detected medium. If the medium is formed of a plate, the band itself can be in a conventional style, requiring no special expedient. If the medium is attached to the band, on the other hand, it is unnecessary to insert the plate beforehand.

Figure 12:
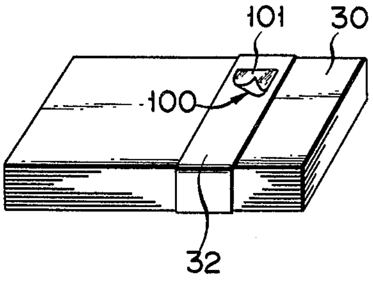
FIG. 12 is a perspective view of a paper sheet bundle accompanied with a to-be-detected medium in a further different style.

FIG. 12 shows a modification of the third embodiment. In the third embodiment, the optically detectable material is applied directly to the specified region of the band 32. In this modification, however, a label 101 coated with such optically detectable material is bonded as a to-be-detected medium 100 to the band 32 put on the bundle 30. This arrangement can be used alternatively to the arrangement of the third embodiment.

What we claim is:

1. A method for processing paper sheets of paper sheet bundles each tied up with a band including steps of successively locating banded paper sheer bundles in layers in a setting section and removing the paper sheets of each located bundle from said setting section, the improvement which comprises steps of:

(a) attaching a to-be-detected medium bearing common detection information to each said bundle;

(b) disposing a detecting means over said setting section so as to detect the to-be-detected medium attached to the bundle which has reached said setting section;

(c) removing the band from the bundle located in said setting section;

(d) storing the removed band in a storing section; and (e) removing the paper sheets one by one from the bundle having its band removed according to step (c); and (f) detecting the to-be-detected medium attached to the next successive bundle by said detecting means after all the paper sheets of the bundle located in said setting section have been removed according to step (e) to once stop the delivery of the paper sheets.

2. A method according to claim 2, wherein said to-be-detected medium is inserted between the bundle and band corresponding thereto.

3. A method according to claim 2, wherein said step of removing the band includes a first sub-step of cutting the band and a second sub-step of carrying the cut band to said storing section.

4. A method according to claim 3, wherein said to-be-detected medium is formed of magnetic material, and the band cut in said first sub-step is carried, in said second sub-step, together with said to-be-detected medium to said storing section by an electromagnet as said band is attracted to said electromagnet.

5. A method according to claim 1, wherein said to-be-detected medium is formed on the band of its corresponding paper sheet bundle.

6. A method according to claim 5, wherein said to-be-detectd medium on the band is detected optically.

7. A method according to claim 6, wherein said step of removing the band includes a first sub-step of cutting the band and a second sub-step of carrying the cut band to said storing section, and the band cut in said first sub-step is carried, in said second sub-step, to said storing section as said band is caught by hook members disposed along the side faces of the bundle corresponding to said band.

8. A method for processing paper sheets of paper sheet bundles each tied up with a band including steps of successively locating banded paper sheet bundles in layers in a setting section and removing the paper sheets of each located bundle from said setting section, the improvement which comprises:

(a) attaching an optically detectable to-be-detected medium on the bands of said paper sheet bundles, said medium bearing common detection information to each said bundle;

(b) disposing detecting means over said setting section so as to detect the to-be-detected medium attached to the bundle which has reached said setting section;

(c) removing the band from the bundle located in said setting section by;

(i) cutting the band; and (ii) carrying the cut band to a storing section by catching the band with hook members disposed along the side faces of the bundle corresponding to said band and separating the cut band from the hook members by means of a beat member to compel the cut band to be separated from said hook members and drop into said storing section;

(d) storing the removed bands in said storing section; and (e) detecting the to-be-detected medium attached to the next bundle by said detecting means after all the paper sheets of the bundle located in said setting section are removed, thereby once stopping the delivery of the paper sheets.

9. A method according to claim 3 or 7, wherein the paper sheets are removed from said setting section after the band cut in said first sub-step is thoroughly removed from its corresponding bundle in said second sub-step.

10. A method according to claim 3 or 7, wherein the paper sheets of the bundle corresponding to the band cut in said first sub-step are removed from said setting section the moment said band is removed from said bundle in said second sub-step.

11. A processing machine for paper sheets of paper sheet bundles each tied up with a band including a setting section in which the banded paper sheet bundles are successively located in layers, and delivery means for removing the paper sheets of each said bundle located in said section therefrom, the improvement which comprises:

to-be-detected media attached severally to said bundles, said media bearing common detection information for each bundle;

detecting means operatively connected to said delivery means and disposed over said setting section for detecting the to-be-detected medium attached to the bundle which has reached said setting section;

means for removing the band from the bundle located in said setting section;

means defining a storing section for storing the removed band; and wherein the paper sheets of the bundle having the band removed therefrom by said band removing means are removed successively sheet by sheet by said delivery means, said detecting means then detecting the to-be-detected medium attached to the next successive bundle after all the paper sheets of said unbanded bundle are removed for once disabling the operation of said delivery means.

12. A processing machine according to claim 11, wherein said removing means includes a knife member for cutting the band on the bundle and a band transfer means for transferring the cut band to said storing section.

13. A processing machine according to claim 12, wherein said to-be-detected medium is formed of a plate disposed on each said paper sheet bundle.

14. A processing machine according to claim 13, wherein said plate is inserted between the bundle and band corresponding thereto.

15. A processing machine according to claim 13, wherein said plate has a slit to be in frictional engagement with its corresponding band so that said plate may be attached to said corresponding band by means of said slit.

16. A processing machine according to claim 14 or 15, wherein said plate is formed of magnetic material, and said band transfer means includes an electromagnet to attract said plate, whereby the band cut by said knife member, along with said plate, is transferred to said storing section.

17. A processing machine according to claim 13, wherein said plate as the to-be-detected medium has a detection region on a part of the surface thereof, said detection region facing said detecting means when the bundle concerned is located in said setting section.

18. A processing machine according to claim 16, wherein said detecting means includes a brush capable of being in contact with said plate as the to-be-detected medium.

19. A processing machine according to claim 14, wherein said knife member cuts that portion of the band on the bundle located in said setting section which overlies the plate.

20. A processing machine according to claim 12, wherein said to-be-detected medium is formed on the band of each said bundle.

21. A processing machine according to claim 20, wherein said band transfer means is formed of hook members capable of catching the band cut by said knife member as said hook members move to said storing section.

22. A processing machine for paper sheets of paper sheet bundles each tied up with a band including a setting section in which the banded paper sheet bundles are successively located in layers, and delivery means for removing the paper sheets of each said bundle located in said section therefrom, the improvement which comprises:

to-be-detected media formed on the band of each said bundle, said media bearing common detection information for each bundle;

detecting means disposed over said setting section so as to detect the to-be-detected medium fored on the band of the bundle which has reached said setting section;

means for removing the band from the bundle located in said setting section;

a storing section for storing the removed band; wherein said removing means includes a knife member for cutting the band on the bundle and band transfer means for transferring the cut band to said storing section, said band transfer means including hook members facing each other on both sides of the paper sheet bundle located in said setting section and being capable of catching the band cut by said knife member as said hook members move to said storing section, whereby the paper sheet of the bundle cleared of the band by said band removing means are removed successively by said delivery means, and the to-be-detected medium attached to the next bundle is detected by said detecting means after all the paper sheets of said unbanded bundle are carried out, thereby once disabling the operation of said delivery means.

23. A processing machine for paper sheets of paper sheet bundles each tied up with a band including a setting section in which the banded paper sheet bundles are successively located in layers, and delivery means for removing the paper sheets of each said bundle located in said section therefrom, the improvement which comprises:

to-be-detected media formed on the band of each said bundle, said media bearing common detection information for each bundle;

detecting means disposed over said setting section so as to detect the to-be-detected medium fored on the band of the bundle which has reached said setting section;

means for removing the band from the bundle located in said setting section;

a storing section for storing the removed band; wherein said removing means includes a knife member for cutting the band on the bundle and band transfer means for transferring the cut band to said storing section, said band transfer means including hook members being capable of catching the band cut by said knife member as said hook members move to said storing section; and a beat member for separating from said hook members the band transferred to said storing section by means of said hook members to beat down said band into said storing section, whereby the paper sheets of the bundle cleared of the band by said band removing means are carried out successively by said delivery means, and the to-be-detected medium attached to the next bundle is detected by said detecting means after all the paper sheets of said unbanded bundle are removed, thereby once disabling the operation of said delivery means.

24. A processing machine according to claim 11, wherein said to-be-detected medium has optical detection information to be optically detected by said detecting means.

25. A processing machine according to claim 11, wherein said storing section adjoints said setting section.

* * * * *